United States Patent [19]
Dummer et al.

[11] Patent Number: 5,967,012
[45] Date of Patent: Oct. 19, 1999

[54] WASTE AEROSOL CONTAINER PROCESSOR

[75] Inventors: David L. Dummer, Longmont, Colo.; Jack L. McCrea, Pittsburgh; Roy Jay Maloney, West Mifflin, both of Pa.

[73] Assignee: The United States of America as represented by the Secretary of the Navy, Washington, D.C.

[21] Appl. No.: 08/753,051

[22] Filed: Nov. 19, 1996

[51] Int. Cl.$^6$ .................................. B67B 7/48; B67B 7/52
[52] U.S. Cl. ................................ 83/451; 30/448; 30/449; 30/353; 30/357; 30/447; 83/54; 83/467.1; 83/636; 83/946; 83/953; 83/162
[58] Field of Search ........................... 30/443–449, 357, 30/396, 353; 83/54, 30, 946, 953, 636, 697, 454, 563, 467.1, 613, 631, 821, 162, 165, 167, 451

[56] References Cited

U.S. PATENT DOCUMENTS

| | | | |
|---|---|---|---|
| 847,526 | 3/1907 | Taylor | 83/636 X |
| 994,755 | 6/1911 | Kraut | 83/636 X |
| 1,650,842 | 11/1927 | Luntz | 30/448 X |
| 1,964,457 | 6/1934 | Diamond | 83/636 |
| 2,832,134 | 4/1958 | Lukan | 30/16 |
| 3,114,248 | 12/1963 | Morrison | 62/64 |
| 3,196,728 | 7/1965 | Snow | 83/618 |
| 3,411,387 | 11/1968 | Bailey | 83/30 |
| 3,678,578 | 7/1972 | Patton, Jr. et al. | 30/448 X |
| 3,747,450 | 7/1973 | Hudson | 83/30 |
| 3,797,112 | 3/1974 | Paulson | 30/366 |
| 3,843,586 | 10/1974 | Wolf | 260/29.7 R |
| 4,101,494 | 7/1978 | Kent et al. | 260/29.6 B |
| 4,137,206 | 1/1979 | Kent | 260/29.6 B |
| 4,224,208 | 9/1980 | Kent | 260/26.9 B |
| 4,337,322 | 6/1982 | Jaspon | 523/166 |
| 4,501,825 | 2/1985 | Magyar et al. | 521/78 |
| 4,541,251 | 9/1985 | Louradour et al. | 62/64 |
| 4,670,987 | 6/1987 | Casey, Jr. | 30/443 X |
| 4,715,920 | 12/1987 | Ruppman et al. | 156/344 |
| 4,796,361 | 1/1989 | Neal | 30/445 X |
| 4,881,459 | 11/1989 | Ramun | 100/95 |
| 4,944,333 | 7/1990 | Gold et al. | 30/448 X |
| 4,956,916 | 9/1990 | Robertson | 30/446 X |
| 5,231,908 | 8/1993 | Skvarce et al. | 83/54 X |
| 5,237,899 | 8/1993 | Schartinger | 83/454 X |
| 5,265,762 | 11/1993 | Campbell et al. | 30/448 X |
| 5,274,906 | 1/1994 | Ter Haar | 83/946 X |

FOREIGN PATENT DOCUMENTS

| | | | |
|---|---|---|---|
| 564625 | 8/1959 | Italy | 30/448 |
| 139272 | 3/1920 | United Kingdom | 30/443 |

*Primary Examiner*—Rinaldi I. Rada
*Assistant Examiner*—Boyer Ashley
*Attorney, Agent, or Firm*—Howard Kaiser

[57] ABSTRACT

The invention features implementation of a flat triangular blade which has two cutting edges and a sharp point. The blade is caused to move pointwise across a cylindrical can's diameter, with the plane of the blade perpendicular to the can's axis, so that the point pierces the can, the two cutting edges slice through the can in both directions around the can's circumference, and the point again, diametrically oppositely, pierces the can. The inventive removal of the residual contents and propellants from a spent aerosol can is optimally effective, because the invention divides the can into two separate parts, concomitantly subdividing the can's internal components.

18 Claims, 11 Drawing Sheets

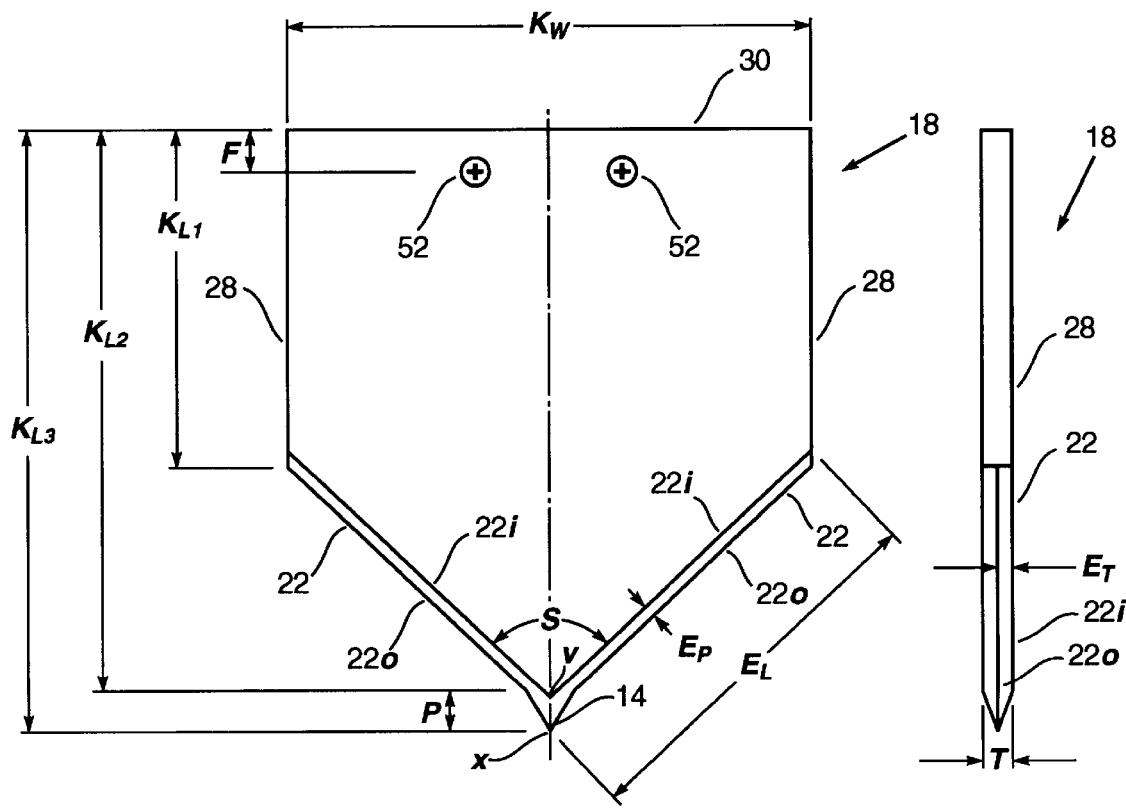
FIG. 14  FIG. 15
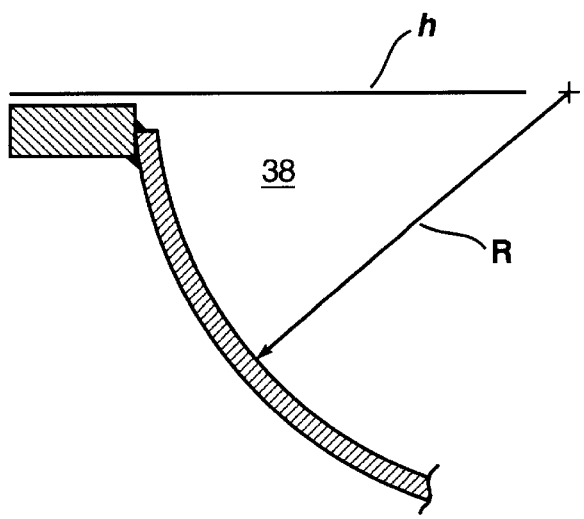
FIG. 16

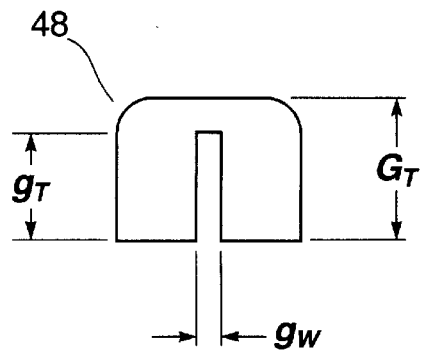
FIG. 17
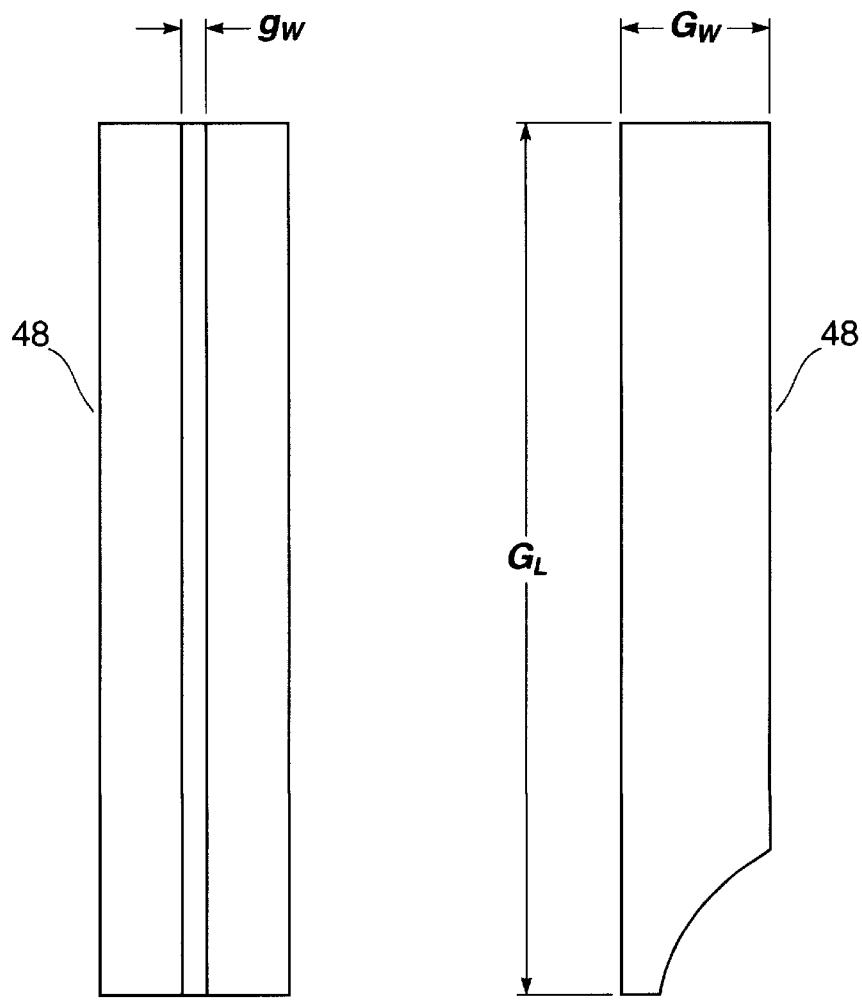
FIG. 18  FIG. 19

WASTE AEROSOL CONTAINER PROCESSOR

The invention described herein may be manufactured and used by or for the Government of the United States of America for governmental purposes without the payment of any royalties thereon or therefor.

BACKGROUND OF THE INVENTION

This invention relates to methods and apparatuses for penetrating containers, more particularly to such methods and apparatuses which are used for hazard abatement of aerosol container refuse.

Many commercially available substances (e.g., paints, insecticides, detergents, etc.) are packaged under pressure in conjunction with a gaseous propellant so as to be releasable as an aerosol. Aerosol containers (commonly referred to as aerosol "cans") present a potentially hazardous condition because of their pressurized flammable contents.

Often the need arises for expellation of the residual contents of used, spent and defective aerosol containers, so as to reduce hazards associated with their storage or disposal. Specifically, a container which has not been completely depressured and/or which has not been completely evacuated of liquid and/or gaseous residue may represent a perilous situation in terms of flammability, toxicity and explosiveness.

Conventional approaches to depressurizing the contents of a waste aerosol container have involved puncturing of the aerosol container. Conventional devices release the pressure held within the container by forcing a pointed object through the container wall, thereby producing a permanent hole.

These conventional processing methodologies are not entirely effective for processing aerosol containers, especially containers of more recent vintage. Conventional container processing often does not allow for complete drainage of the aerosol container's liquid contents; the liquid contents may not be provided adequate pathways to escape under gravitational forces. Furthermore, conventional processing approaches often fail to release all the propellant gases that are contained in the aerosol; escape of propellant gases from the single puncture hole may be unacceptably slow, perhaps even practically nonexistent. Moreover, the latest design containers have internal components which may obstruct complete processing when conventional methods are used.

SUMMARY OF THE INVENTION

In view of the foregoing, it is an object of the present invention to provide method and apparatus for accomplishing as complete removal as possible of the residual contents and propellants from aerosol containers which are no longer intended for or suitable for use, in order that such containers can safely be stored or discarded.

It is another object of this invention to provide such method and apparatus which are efficient and practical.

The present invention provides method and apparatus for severing an object. The object is of a type having an exterior wall which is configured for effecting containment, e.g., an aerosol container. According to the invention, the object is held in place. A substantially planar blade, which includes a substantially triangular portion having two angled edges and a vertex tip, is carried transversely with respect to the object, whereby the blade tip punctures the object wall at two locations and the two blade edges slice the object wall between the two locations.

Many embodiments of this invention provide apparatus for dividing a structure which includes a closed peripheral section. The apparatus comprises a holder for the structure, a substantially flat blade, and a carriage mechanism for the blade. The blade has two oblique knife edges and a sharp tip at the junction of the edges. The blade approximately defines an imaginary plane. The carriage mechanism orients the blade with the tip toward the closed peripheral section whereby an imaginary closed peripheral line is formed in the closed peripheral section by the intersection of the closed peripheral section with the imaginary plane. The carriage mechanism provides approximately linear movability of the blade within the imaginary plane and across the closed peripheral section.

The present invention features implementation of a flat triangularly shaped blade whereby the blade travels in an essentially linear direction in the plane of the blade and thereby effects division of a single container into two separate container parts. The inventive processing thus advantageously accomplishes a "large scale destruction" of the container, thereby furthering depressurization and fluid evacuation (both liquid and gaseous) of the container. By inventively severing the container into two pieces, the invention serves to afford sufficient pathways for complete evacuation of the container; in particular, the invention serves to break apart all internal container mechanisms which, if left intact, could impede depressurization or evacuation.

In other words, the invention not only divides the container but also subdivides all internal components which could hinder or thwart the usual objectives of aerosol container processing. By contrast, conventional processing techniques permit internal container components to remain in place, thereby permitting retention of internal pressure, residual fluid contents and/or propellant gases.

For many inventive embodiments the container-severance procedure includes the following: The triangular blade punctures the container a first time, then effectuates bilateral bidirectional perimetric (e.g., circumferential) slicing, then punctures the container a second time, and then effectuates bilateral quadridirectional perimetric (e.g., circumferential) slicing, whereupon complete separation ensues.

Many inventive embodiments purposely benefit from geometrical symmetry both of the blade and of the container. Inventive embodiments having these symmetrical qualities especially manifest, to great advantage, a type of bilateral synchronism of the inventive severance procedure. According to such embodiments, with some degree of approximation, an isosceles blade (i.e., having two equal knife edges) is utilized in geometrically complementary fashion for bisectingly processing a cylindrical container.

In accordance with inventive embodiments wherein an isosceles blade is used for dividing a cylindrical container, the isosceles blade travels, with the point of the blade frontward, in a direction which is coincident with the blade's bisector and the cylindrical container's diameter and which is perpendicular to the container's longitudinal axis, so that the following sequence occurs: The point of the blade perforates the container at a first location; in virtual concurrence, the blade's two knife edges bilaterally cut through the container, around the container's perimeter, in two opposite downward circumferential directions (i.e., with the first knife edge cutting downwardly counterclockwise and the second knife edge cutting downwardly clockwise); the point of the blade perforates the container at a second location which diametrically opposes the first location; in virtual concurrence, the blade's two knife edges bilaterally cut through the container, around the container's perimeter, in two opposite downward circumferential directions and in two opposite upward circumferential directions (i.e., with the first knife edge cutting both downwardly counterclockwise and upwardly clockwise, and with the second knife edge cutting both downwardly clockwise and upwardly counterclockwise); and, in virtual concurrence, the first knife edge's downwardly counterclockwise cutting and upwardly clockwise cutting converge (i.e., approach and meet), and the second knife edge's downwardly clockwise cutting and upwardly counterclockwise cutting converge (i.e., approach and meet), thereby effecting complete severance of the container.

The vectorial forces of the cutting actions of the knife edges are not strictly aligned with the perimetric path but, rather, have admixtures of transverse and perimetric force components. These forces are inventively availed so as to largely preserve the integrity of the aerosol container's shape. Total or substantial collapse of an aerosol container would be undesirable because it would hamper escape of the fluid contents. The present invention substantially avoids collapse of the container wall but permits a beneficial degree of deformation of the container wall.

In an earlier phase of the inventive severence procedure (i.e., following the first puncturing of the container wall), the opposing cutting forces associated with the bidirectional circumferential cutting actions threaten to collapse the container wall; this is because these forces, acting in the diametrically upper vicinity of the container, are not being supported or counterbalanced by forces in the diametrically lower vicinity of the container. In a latter phase of the inventive severence procedure (i.e., following the second puncturing of the container wall), the opposing cutting forces associated with the quadridirectional circumferential cutting actions act in concert; the opposing cutting forces tend to cancel out one another sufficiently to reduce or curtail cave-in of the container wall.

At the same time, the small degree of container wall deformation which accompanies the inventive severence procedure may assist the expedient escape of gases, especially from containers of more modern design which have an internal plunger working directly against the internal contents. Hence, in the invention's uniquely efficacious manner, the synergistic combination of the blade's triangularity, the container's cylindricality and the blade-vis-a-vis-container severing activity serves to minimize but not entirely eliminate the shape deformation of the aerosol container. Inventive embodiments characterized by symmetrical geometry of blade and container particularly enjoy the attendant advantages.

The inventive synergy of the blade's triangular shape acting upon the container's cylindrical shape promotes the ease and effectiveness of the blade's cutting action. The triangular blade's tip essentially presents a small frontal area which facilitates both the initial and final perforations. As the blade travels between the blade tip's initial and final perforations, the blades triangularity progressively subjects the container wall to an increasing blade width. This progressive increase in blade width is associated with a tendency of the blade to cut the container's wall with bilaterally paired side force components (i.e., in paired outwardly sideways directions) in addition to bilaterally paired perimetric force components (i.e., in paired directions of perimetric travel).

According to many inventive embodiments, there is a trigonometric relationship between the magnitude of the triangular blade's "inclusive angle" (i.e., the angle formed by the two knife edge line segments meeting at the tip vertex) and the rate at which the blade width changes in relation to the container. The magnitude of the blade's inclusive angle may affect the degrees and proportions of the transverse and perimetric force components which accompany the blade's cutting activity. In addition, when the blade effectuates bilateral quadridirectional circumferential slicing, there eventually is convergence of the first knife edge's downwardly counterclockwise cutting and upwardly clockwise cutting, as well as convergence of the second knife edge's downwardly clockwise cutting and upwardly counterclockwise cutting; the locations of these two cutting convergences (i.e., meetings) vary in accordance with the blade's inclusive angle. Accordingly, the inventive blade's inclusive angle is a variable parameter which, in the light of the teachings herein, the ordinarily skilled artisan who practices this invention can optimize depending upon the requirements for a particular application.

In accordance with the principles of this invention, the fluid contents having liquid characteristic will gravitationally drain from the container, and the fluid contents having gaseous characteristic (e.g., propellant gases) will escape from the container. For most inventive embodiments it is preferable that the liquid and gaseous emissions each be separately collected in auxiliary containment apparatus so as to prevent environmental exposure. Rather than be permitted to diffuse amidst the surroundings, the liquid emissions should be drained into a receptacle, and the gaseous emissions should be captured by any of various techniques known to the ordinarily skilled artisan. In exceptional situations the gaseous emissions may perhaps be permitted to be diluted with the surrounding atmosphere, provided that such would not be illegal and the deleterious effects would be virtually nonexistent; in general, however, such is considered imprudent for inventive practice. A cavalier attitude toward disposition of the liquid and gaseous emissions from aerosol containers is condemned and discouraged.

Many inventive embodiments take advantage of the physical laws of gravitation. According to such embodiments, the blade is oriented vertically and the container is oriented horizontally so that, upon completion of the blade's severance of the container, drainage of the container's liquidly flowing contents is facilitated.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawing, wherein like numbers indicate the same or similar components, and wherein:

FIG. 14 is an enlarged diagrammatic view, similar in perspective to the view shown in FIG. 13, of the blade for the blade assembly shown in FIG. 13.

FIG. 15 is an edgewise diagrammatic elevation view of the blade shown in FIG. 14.

FIG. 16 is an enlarged diagrammatic partial elevation view, similar in perspective to the view shown in FIG. 12, of the holding chamber for the inventive embodiment shown in FIG. 10.

FIG. 17 is an enlarged diagrammatic plan view, similar in perspective to the view shown in FIG. 10, of one of the two blade guides for the inventive embodiment shown in FIG. 10.

FIG. 18 is a diagrammatic elevation view, similar in perspective to the view shown in FIG. 11, of the blade guide shown in FIG. 17.

FIG. 19 is a diagrammatic elevation view, similar in perspective to the view shown in FIG. 12, of the blade guide shown in FIG. 17.

DETAILED DESCRIPTION OF THE INVENTION

Figure 1:
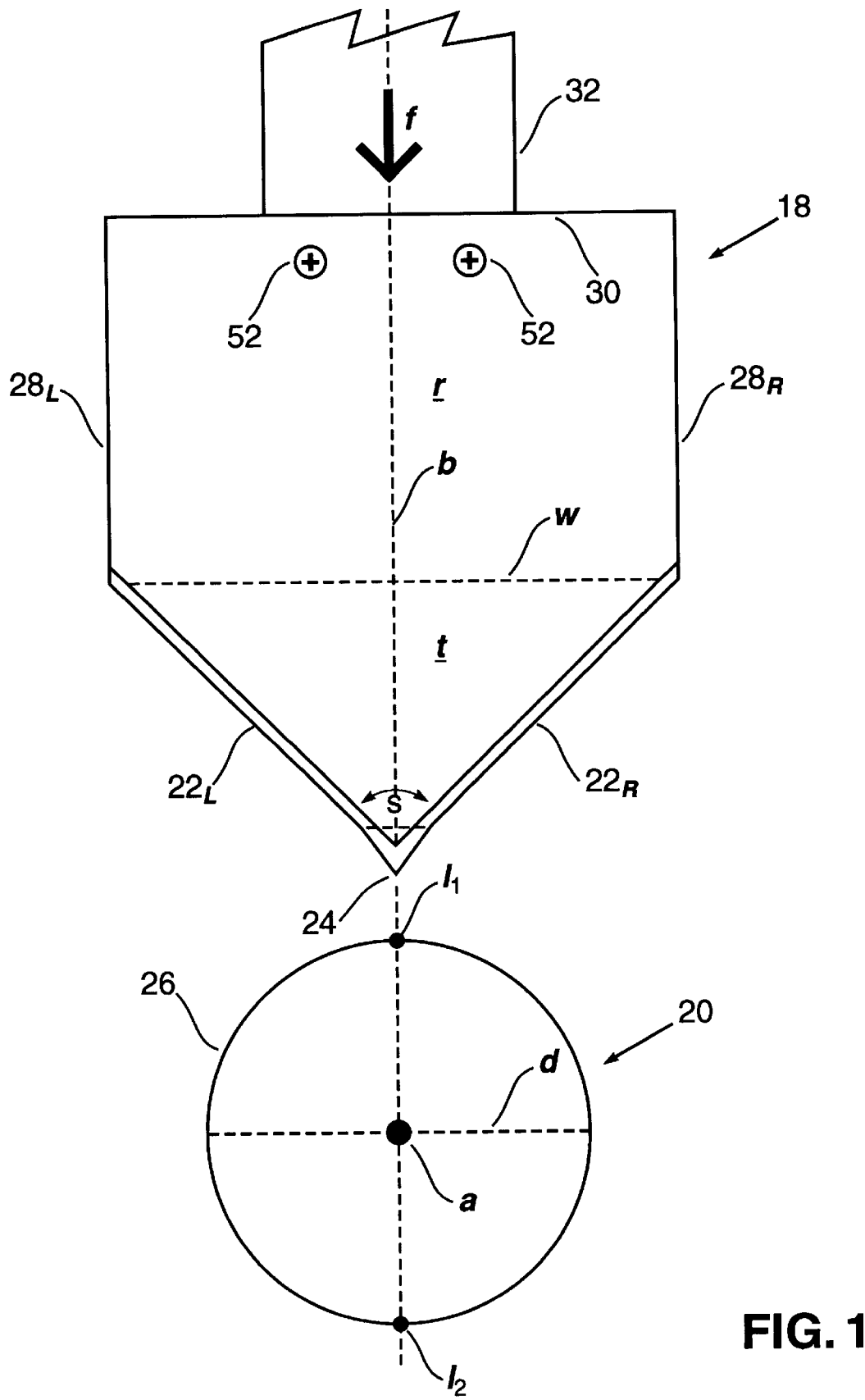
FIG. 1 through FIG. 4 diagrammatically illustrate severance of a container by a blade in accordance with the present invention.

Referring now to FIG. 1, vertical flat metallic blade 18 is situated directly above horizontal cylindroid aerosol container 20 and is poised for penetration. Blade 18 has two smooth knife edges, viz., lefthand edge $22_L$ and righthand edge $22_R$, which meet at piercingly sharp tip 24 and thereby form inclusive angle s. Container 20 has cylindrical side wall 26, which appears as a circle in FIG. 1. Wall 26 is symmetrical with respect to the longitudinal axis a of container 20. Longitudinal axis a appears as a center point in FIG. 1. The slight projection of tip 24 in the plane of blade 18 serves to facilitate puncturing of wall 26 by tip 24.

Horizontal dashed line segment w indicates the base of the blade's isosceles triangular portion t formed by segment w and equal edges $22_L$ and $22_R$. Segment w also corresponds to the width of blade 18, which exeeds the diameter, indicated by dashed line segment d, of container 20. Inclusive angle s is ninety degrees and knife edges $22_L$ and $22_R$ are equal; hence, blade portion t is an isosceles right triangle.

The two smooth noncutting vertical blade edges $28_L$ and $28_R$ are equal, opposite and parallel and, together with segment w and horizontal upper blade edge 30, form rectangle r which is immediately vertically adjacent to triangle t. The rectangular configuration of upper blade portion r, in particular, the verticality of edges $28_L$ and $28_R$, lend blade 18 to sliding engagement with two vertical grooved blade guides such as shown in FIG. 17 through FIG. 19. For such inventive embodiments, it is preferable that the blade and the blade guides each be made of a non-sparking metallic material.

Dashed vertical bisector line b bisects blade 18—i.e., bisects both rectangle r and triangle t. In addition, the perpendicular vertical plane through line b (i.e., perpendicular to blade 18) not only bisects blade 18 but also diametrically passes through longitudinal axis a and thereby axially bisects cylindrical side wall 26.

Mechanical actuator 32 is coupled with blade 18, for example by means of fasteners 52. Still with reference to FIG. 1 and also with reference to FIG. 2 through FIG. 4, the invention is basically effectuated by exerting a vertically downward vectorial force f upon blade 18 by means of mechanical actuator 32 such as will cause blade 18 to move vertically downward through cylinder 20 in the direction coincidental with bisector line b. For most inventive embodiments, force f is either humanly driven or electrically driven.

Figure 2:
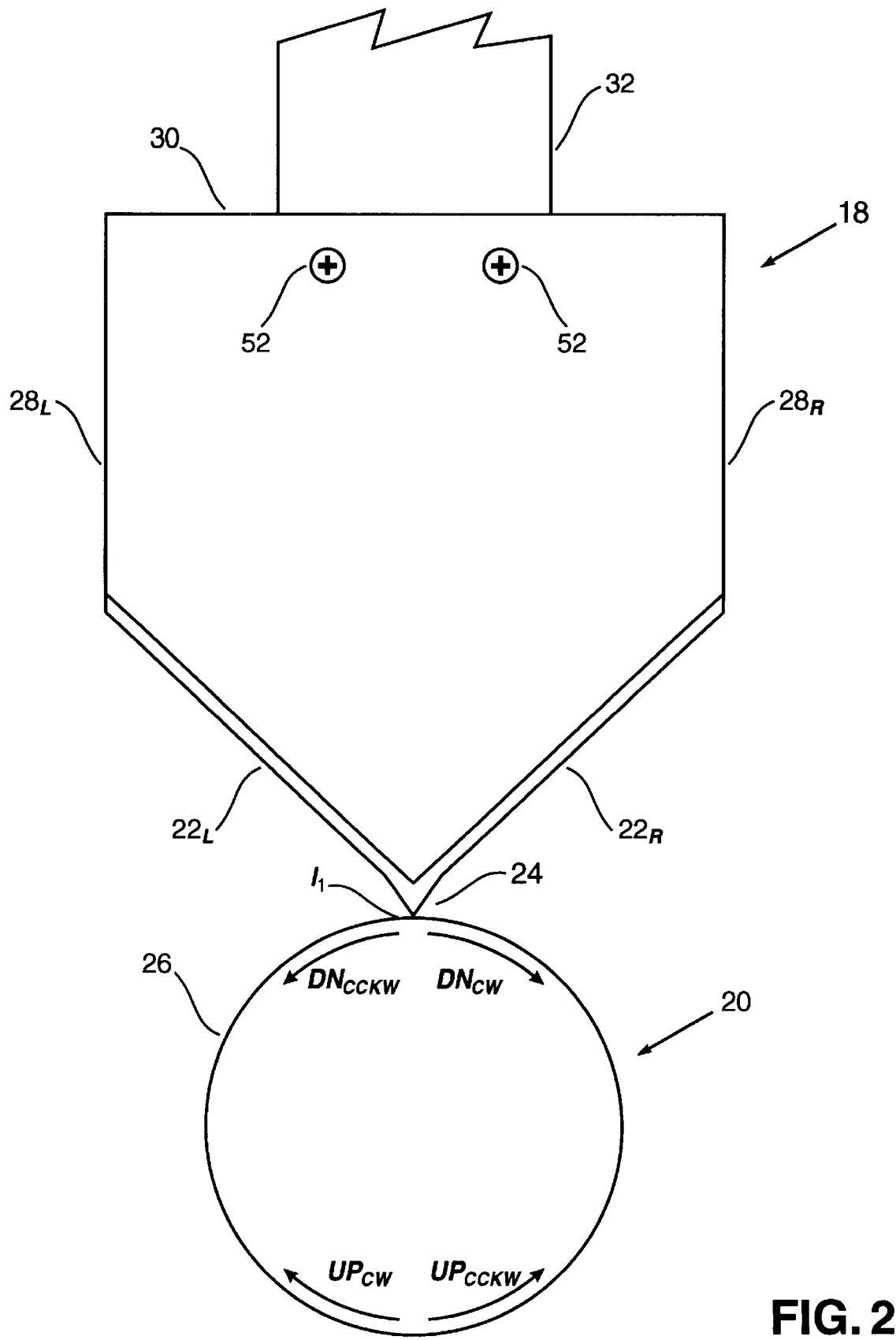

Tip 24 is shown in FIG. 2 contiguously verging on puncturing side wall 26 at location $l_1$. The pressure in container 20 begins to be released as tip 24 punctures a hole in side wall 26. As blade 18 continues to proceed downward, cutting edges $22_L$ and $22_R$ are in bidirectional mode; cutting edges $22_L$ and $22_R$ slice through side wall 26 in virtual simultaneity in two opposite circumferential directions (i.e., righthand edge $22_R$ slicing wall 26 downwardly clockwise as shown by curved arrow $DN_{CW}$ in FIG. 2; lefthand edge $22_L$ slicing wall 26 downwardly counterclockwise as shown by curved arrow $DN_{CCKW}$ in FIG. 2). The container 20 pressure is increasingly released as blade 18 is slowly, steadily and forcibly advanced through side wall 26. The fluid contents may also increasingly seep as blade 18 increasingly penetrates.

Figure 3:
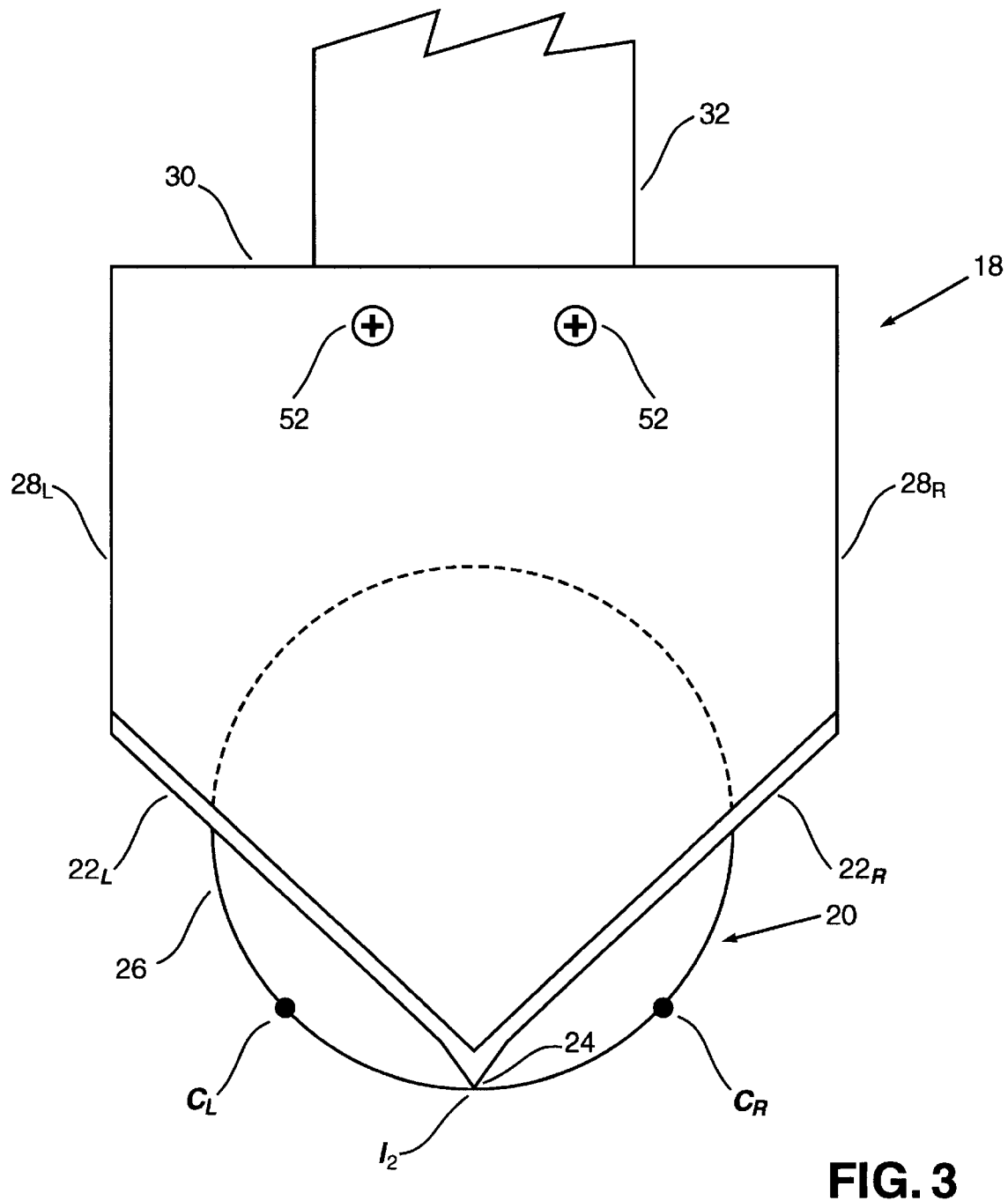

By continuing to force blade 18 vertically across the diameter d of container 20 in this manner, the operator will soon succeed in sectioning container 20 into two parts. Tip 24 is shown in FIG. 3 verging on puncturing side wall 26 at location $l_1 2$, which is diametrically opposite location $l_1$. The inventive processing nears completion as tip 24 punctures a hole in side wall 26 at location $l_2$.

Cutting edges 22 are now in quadridirectional mode; cutting edges $22_L$ and $22_R$ slice through side wall 26 in virtual simultaneity in two pairs of opposite circumferential directions i.e., righthand edge $22_R$ slicing wall 26 downwardly clockwise as shown by curved arrow $DN_{CW}$ in FIG. 2, and upwardly counterclockwise as shown by curved arrow $UP_{CCKW}$ in FIG. 2; lefthand edge $22_L$ slicing wall 26 downwardly counterclockwise as shown by curved arrow $DN_{CCKW}$ in FIG. 2, and upwardly clockwise as shown by curved arrow $UP_{CW}$ in FIG. 2). Soon there is a convergence $c_L$, at the lefthand side of container 20, of the downwardly counterclockwise cutting and upwardly clockwise cutting by lefthand cutting edge $22_L$, as well as a convergence $c_R$, at the righthand side of container 20, of the downwardly clockwise cutting and upwardly counterclockwise cutting by righthand cutting edge $22_R$.

The locations of the two cutting convergences $c_L$ and $c_R$ are a function of the magnitude of inclusive angle s. As shown in FIG. 3, right angle s yields convergences $c_L$ and $c_R$ which are each distanced, in the clockwise and counterclockwise directions, respectively, of circular container wall 26, approximately forty-five degrees of arc from location $l_2$.

Generally with regard to symmetrical inventive embodiments, wherein an isosceles blade 18 is implemented for diametrically bisecting a cylindrical container 20 in accordance with the teachings herein, the arc distances of convergences $c_L$ and $c_R$ from location $l_2$ are approximately equal and each about equivalently varies in inverse relationship with inclusive angle s; that is, as inclusive angle s increases, each arc distance from location $l_2$ decreases, and as inclusive angle s decreases, each arc distance from location $l_2$ increases.

Figure 4:
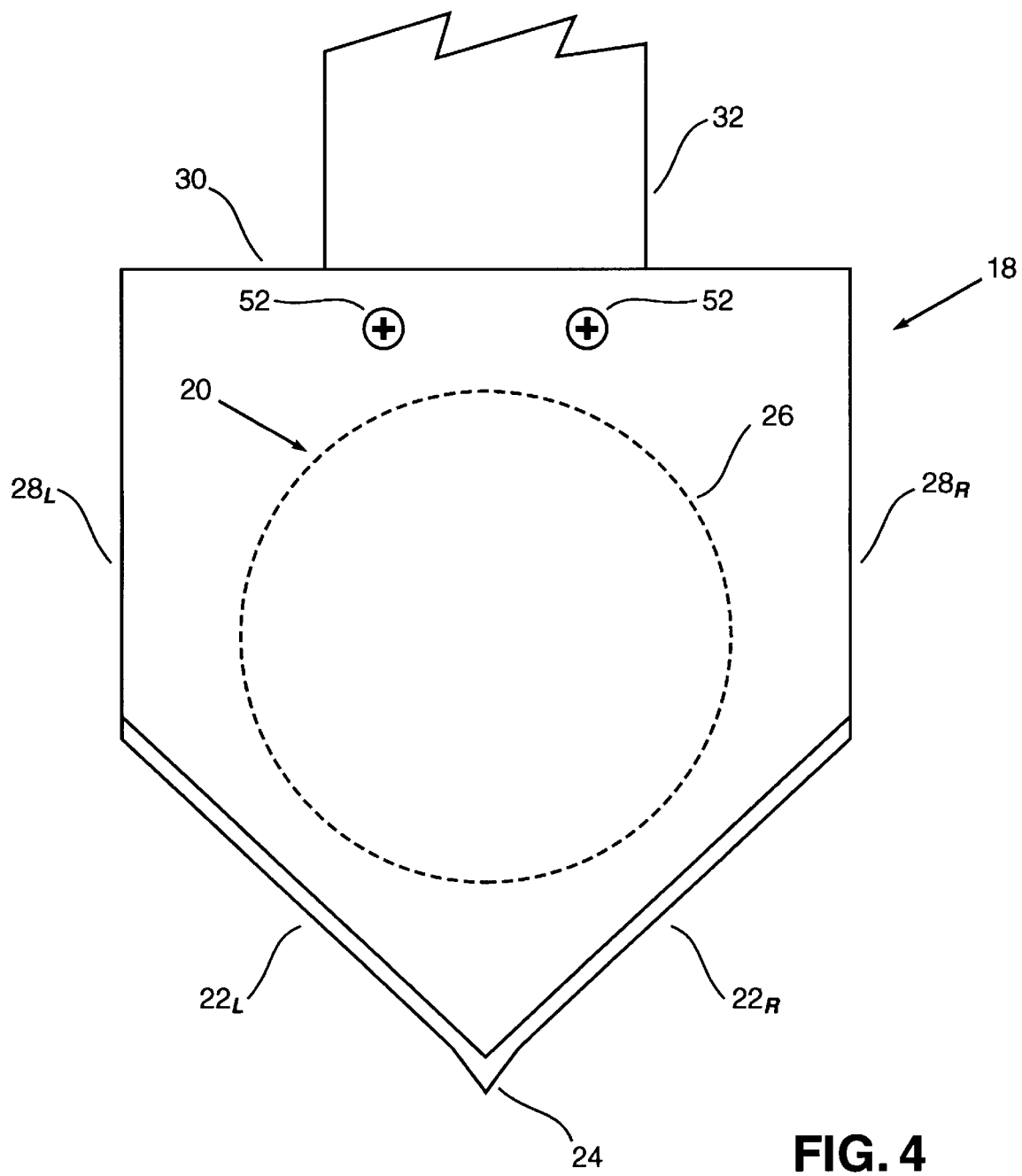

The piercing of a hole at location $l_2$ combines with the continued cutting caused by the ongoing vertically downward movement of blade 18, culminating in realization of convergences $c_L$ and $c_L$ and thus effecting complete separation of container 20 into two container 20 parts. As shown in FIG. 4, blade 18 has completely severed container 20. In so doing, blade 18 has also severed internal components of container 20.

At this point blade 18 can be moved vertically upward and thereby withdrawn from container 20. Once blade 18 is withdrawn, the fluid contents and propellants evacuate completely. The liquid evacuation can be redirected into a collection vessel such as receptacle 58 shown in FIG. 6 through FIG. 9.

Figure 5:
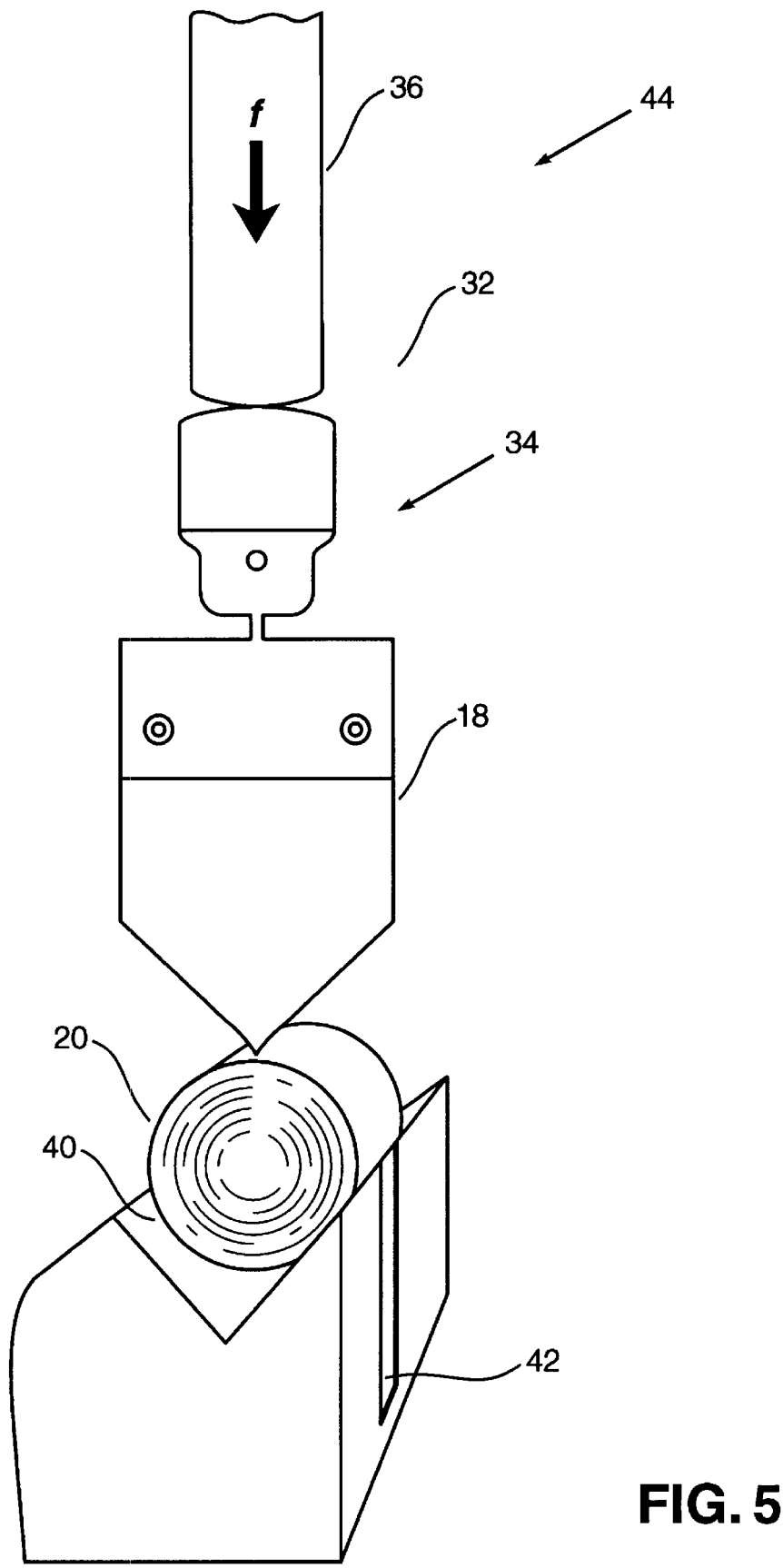
FIG. 5 is a diagrammatic perspective view of an inventive embodiment.
Figure 7:
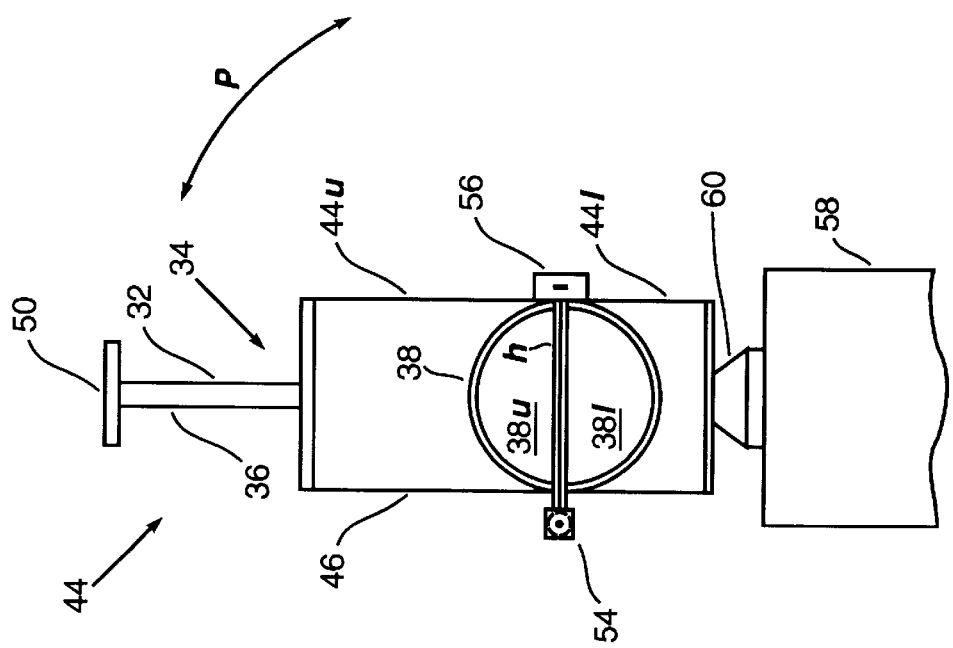
FIG. 7 is a diagrammatic end elevation view of the inventive embodiment shown in FIG. 6.
Figure 6:
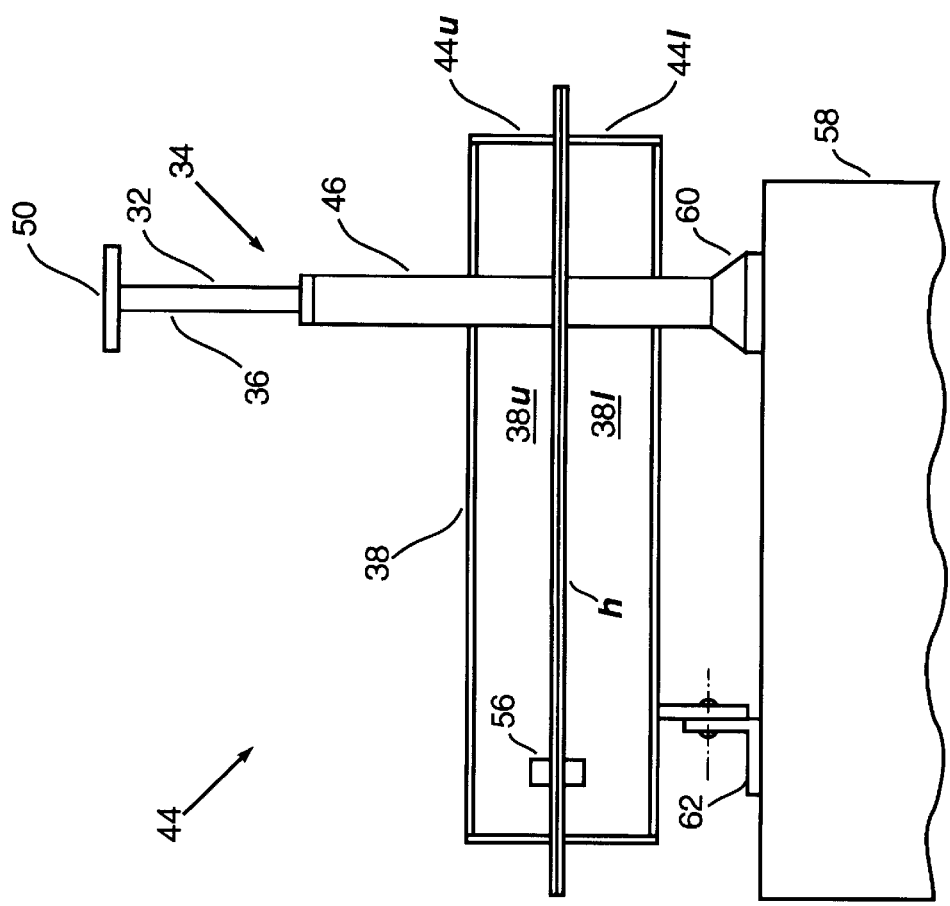
FIG. 6 is a diagrammatic side elevation view of another inventive embodiment.

Referring to FIG. 5, blade assembly 34 includes downwardly vertical blade 18 and drill press-type mechanical actuator 32, which includes shaft-like actuator member 36. Blade 18 is attached to shaft-like member 36. The longitudinal axis of horizontally oriented container 20 is orthogonal with respect to the plane of blade 18. Blade 18 is shown to be about at the stage of processing illustrated in FIG. 2. Container-holding frame 38 is a block (e.g., wooden) which has provided therein "V"-shaped notch 40, for horizontal placement of container 20, and slot 42, for vertical movement of blade 18. Inventive processing apparatus 44 shown in FIG. 5, representative of an initial breadboard tested by the U.S. Navy, thus comprises separate blade-mechanism and container-holding units.

Figure 9:
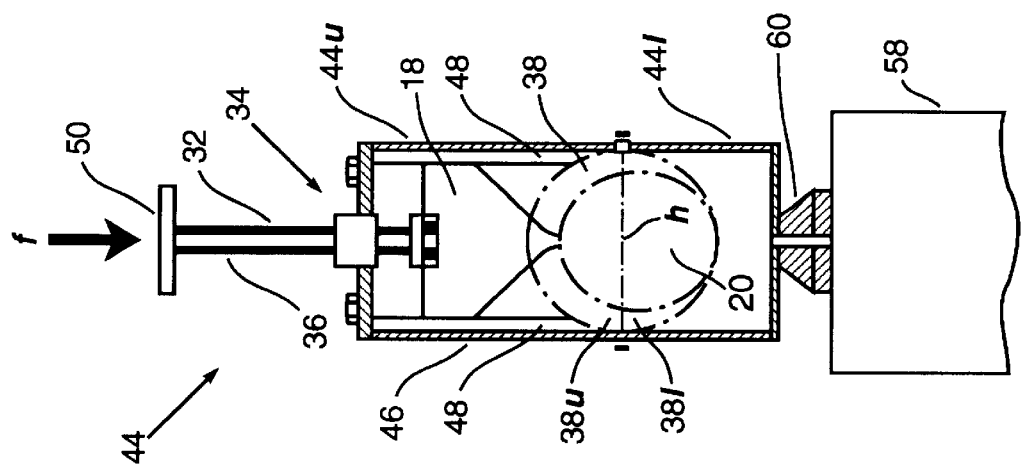
FIG. 9 is a diagrammatic view of the inventive embodiment shown in FIG. 6, similar to to view shown in FIG. 7 but partially in cross section to show some interior detail.

Reference now being made to FIG. 6 through FIG. 9, inventive processing device 44 is a single unit which includes blade assembly 34, vertical blade-mechanism housing 46 and hollow cylindrical horizontal container-holding chamber 38. As shown in FIG. 9, housing 46 interiorly includes two nonsparking metallic vertical blade guides 48. Blade assembly 34 includes downwardly vertical blade 18 and manually operable mechanical actuator 32. Actuator 32 has vertical shaft-like member 36 and horizontal handle 50 at the upper end of shaft-like member 36. One or more fasteners 52 are for attachment of actuator 32 to blade 18 at the lower end of shaft-like member 36. Each of the two vertical edges 28 of nonsparking metallic blade 18 slidably engages one of the two vertical blade guides 48.

Figure 8:
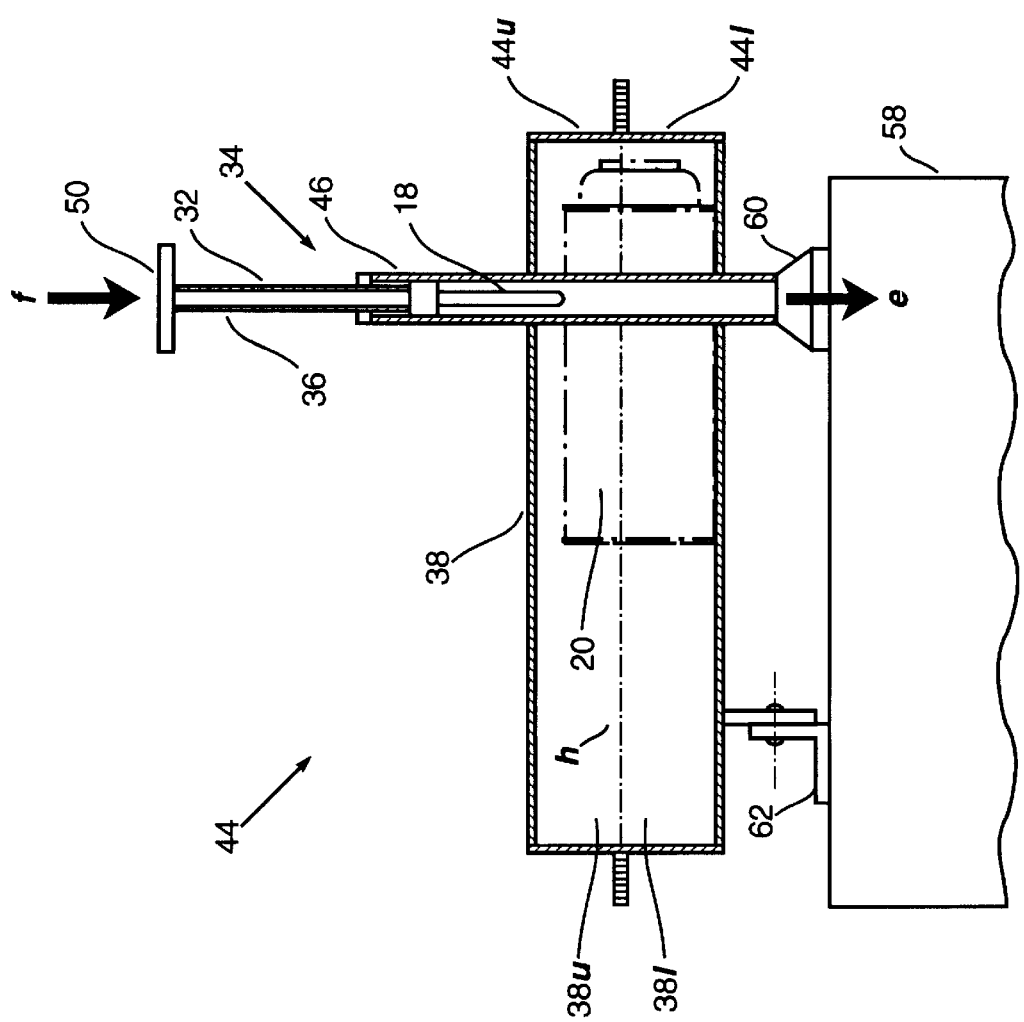
FIG. 8 is a diagrammatic view of the inventive embodiment shown in FIG. 6, similar to to view shown in FIG. 6 but partially in cross section to show some interior detail.

Chamber 38 is for holding container 20 in a horizontal position. The longitudinal axis of container 20 is orthogonal with respect to the plane of blade 18. The operator actuates device 44 for processing of container 20 by manually exerting a downward vertical force f on handle 50. Blade 18 is shown in FIG. 8 and FIG. 9 to be about at the stage of processing illustrated in FIG. 2.

Inventive device 44 is bifurcated along the imaginary horizontal longitudinal axial plane h of chamber 38 into upper inventive device section 44u and lower inventive device section 44l. Upper inventive device section 44u includes upper semicylindrical chamber section 38u; lower inventive device section 44l includes lower semicylindrical chamber section 38l. One or more hinges 54 join upper semicylindrical chamber section 38u with lower semicylindrical chamber section 38u so as to permit pivotably arcuate motion p of upper semicylindrical chamber section 38u (and hence, upper inventive device section 44u) away from or toward lower semicylindrical chamber section 38l (and hence, lower inventive device section 44l), thereby enabling pre-processing placement and post-processing removal of container 20. One or more latches 56 secure closure of upper semicylindrical chamber section 38u with respect to lower inventive device section 44l.

Inventive device 44 is mounted upon receptacle 58 via connector 60 and support foot 62. As indicated by drainage arrow e, receptacle 58, e.g., an industrial standard 5, 30 or 55 gallon drum, receives the effluent which has drained from processed container 20 and has been guided by inventive device 44.

Figure 10:
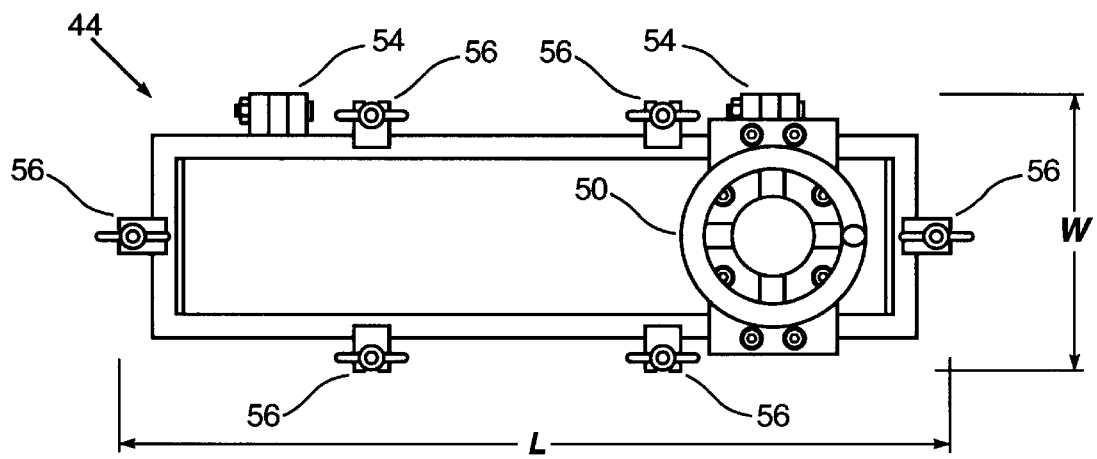
FIG. 10 is a diagrammatic top plan view of an inventive embodiment which is similar to the inventive embodiment shown in FIG. 6.
Figure 11:
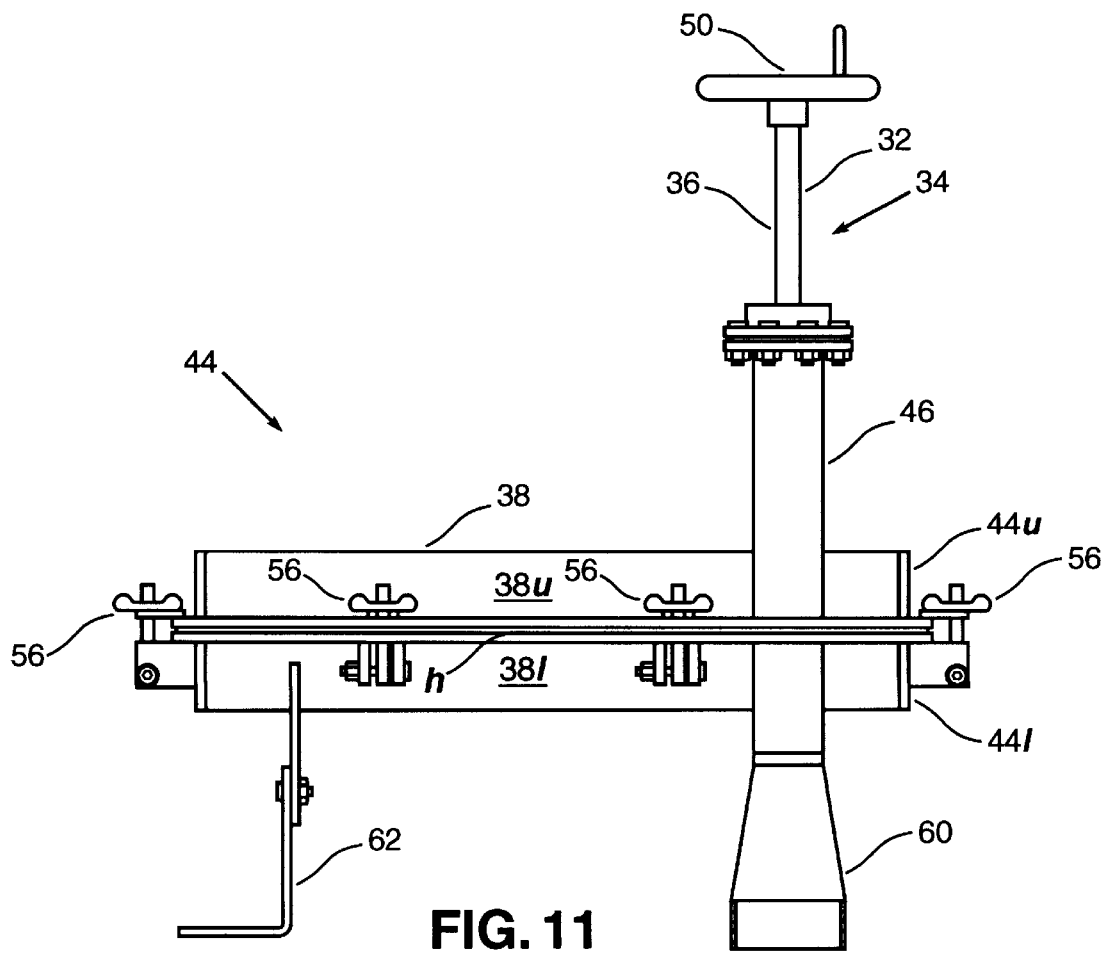
FIG. 11 is a diagrammatic view of the inventive embodiment shown in FIG. 10, similar to to view of the inventive embodiment shown in FIG. 6.
Figure 12:
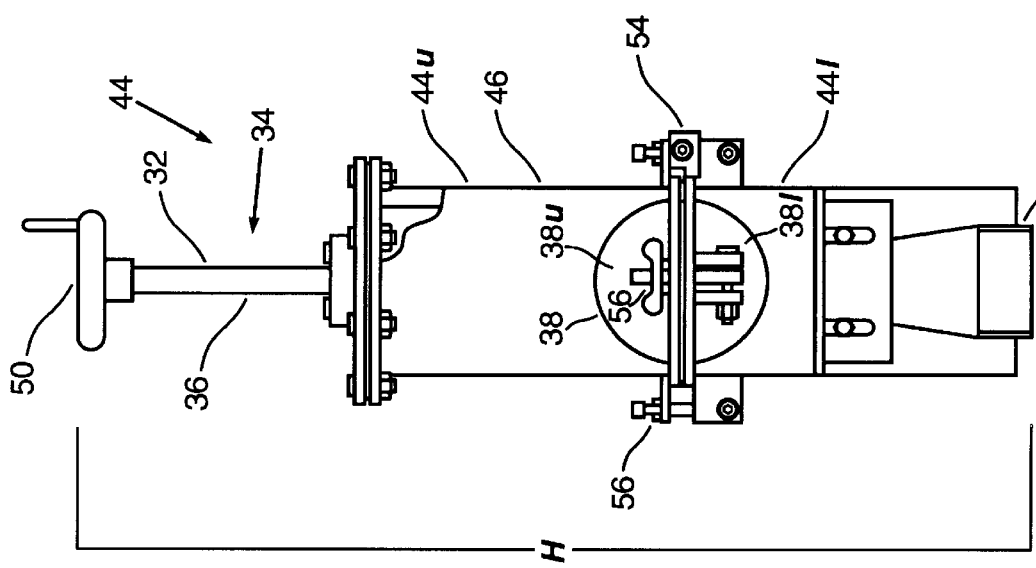
FIG. 12 is a diagrammatic view of the inventive embodiment shown in FIG. 10, similar to to view of the inventive embodiment shown in FIG. 7.

With reference to FIG. 10 through FIG. 19, a metallic prototype of inventive processing device 44, based on inventive processing device 44 shown in FIG. 6 through FIG. 9, has successfully been designed and tested by the U.S. Navy. The inventive processing device 44 prototype shown in FIG. 10 through FIG. 19 is mostly made of steel and bronze parts and materials. The approximate dimensions of the inventive processing device 44 prototype, as represented in FIG. 10 through FIG. 12, are length L=17.75 inches, width W=6.25 inches, extended height H=20.25 inches.

Figure 13:
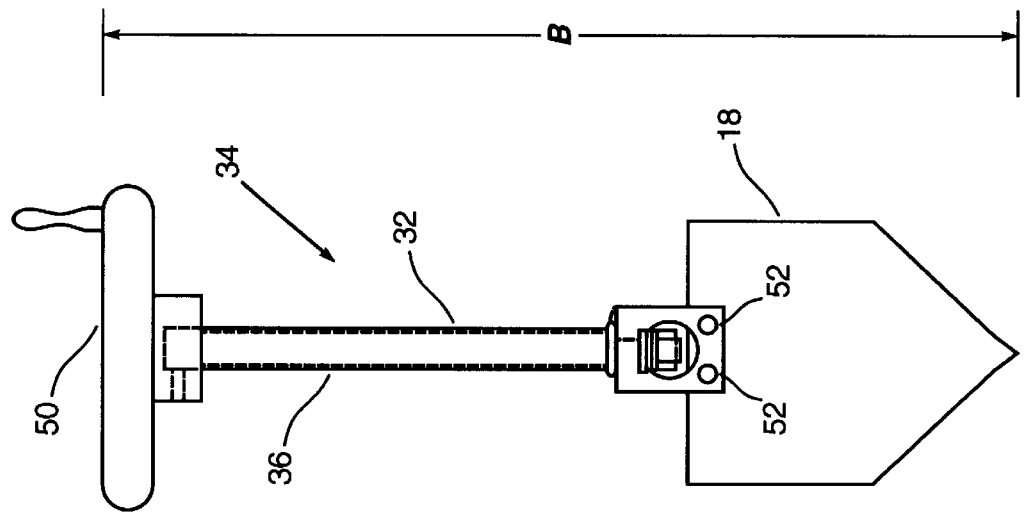
FIG. 13 is an enlarged diagrammatic elevation view, similar in perspective to the view shown in FIG. 12, of the blade assembly for the inventive embodiment shown in FIG. 10.

Blade assembly 34 shown in FIG. 13 has an approximate length B=11.42 inches. Blade 18 shown in FIG. 14 and FIG. 15 has an approximate width $K_W$=3.24 to 3.25 inches. Each noncutting vertical blade edge 28 has a length $K_{L1}$ of approximately 2.13 to 2.14 inches. Each fastener 52 is approximately a distance F=0.28 from horizontal upper blade edge 30. Each cutting blade edge 22 has a length $E_L$ of approximately 2.29 to 2.30 inches. Inclusive angle s is approximately ninety degrees.

Tip 14 of flat blade 18 extends to tip extremity x a distance P approximately 0.25 inches downward from the vertex v of the inner demarcations 22i of cutting edges 22. The distance $K_{L2}$ between horizontal upper blade edge 30 and vertex v is approximately 3.63 to 3.64 inches. The distance $K_{L3}$ between horizontal upper blade edge 30 and extremity x is approximately 3.88 inches.

The width $E_P$ of each cutting edge 22, in terms of in-plane distance between inner demarcation 22i and outer demarcation $22_o$, is approximately 0.06 inches. The thickness T of blade 18 is approximately 0.13 inches. The width $E_T$ of each cutting edge 22, in terms of through-plane distance between inner demarcation 22i and outer demarcation $22_o$, is approximately 0.06 inches.

Hollow cylindrical chamber 38, represented in FIG. 16 as having an inner radius R of approximately 1.63 inches, is especially suitable for holding similarly curvilinearly contoured aerosol containers 20 and is spacious enough to accommodate most conventional aerosol containers 20. In accordance with the teachings herein, many different embodiments of this invention can be practiced for processing aerosol containers 20 of varying sizes and shapes.

As illustrated in FIG. 17 through FIG. 19, each of two grooved blade guides 48 has a length $G_L$ approximately equal to 6.25 inches, a width $G_W$ approximately equal to 1.24 inches, a total depth $G_T$ approximately equal to 1.00 inch, a groove width $g_W$ approximately equal to 0.13 inches, and a groove depth $g_T$ approximately equal to 0.13 inches.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. Apparatus for severing an object, said object having an exterior wall which is configured for effecting containment, said apparatus comprising:

means for holding said object in position;

a substantially planar blade having two equal right angled straight sides and two equal acutely angled straight sides, said two equal acutely angled straight sides each being adjacent to one said equal right angled straight side, said two equal right angled straight sides describing two equivalent blade edge regions, said two equal acutely angled straight sides describing a blade tip region, said two equivalent blade edge regions and said blade tip region having associated therewith two equal right angled straight inner blade demarcations meeting at a vertex, said two equal right angled straight inner blade demarcations each being parallel to one said equal right angled straight side, said two equal acutely angled straight sides meeting at a tip extremity, said two equal right angled straight sides approaching an imaginary point situated intermediate said vertex and said tip extremity, said blade tip region extending approximately between said tip extremity and said vertex, said two equal right angled straight sides and said two equal acutely angled straight sides all being coplanar, said two equal right angled straight sides, said two equal acutely angled straight sides and said two equal right angled straight inner blade demarcations all sharing an imaginary angle bisector which intersects said tip extremity, said imaginary point and said vertex; and means operatively connected to said means for holding for carrying said blade transversely with respect to said object whereby said blade is initially distanced from said object with said tip directed toward said wall, said tip region successively punctures said wall at two locations, and said two equivalent blade edge regions slice said wall between said two locations.

2. Apparatus for severing an object as in claim 1, wherein:

said means for holding includes means for holding said object in an approximately horizontal position;

said means for carrying includes means for carrying said blade in an approximately vertical direction; and said two locations are in approximate vertical alignment.

3. Apparatus for severing an object as in claim 1, further comprising drainage means for fluid substance contained by said object, said drainage means engaging said means for holding said object.

4. Apparatus for severing an object as in claim 1, wherein:

said object is cylindroid, said object having an approximate circumference and an imaginary longitudinal axis of substantial symmetry; and said means for carrying includes means for carrying said blade so that said blade and said imaginary angle bisector are each approximately perpendicular to said axis, said two locations are approximately diametrically opposite, and said two equivalent blade edge regions approximately simultaneously slice an upper portion of said wall in one bilateral pair of opposite circumferential directions and approximately simultaneously slice a lower portion of said wall in two bilateral pairs of opposite circumferential directions.

5. Apparatus for severing an object as in claim 4, wherein:

said means for holding includes means for holding said object in an approximately horizontal position;

said means for carrying includes means for carrying said blade in an approximately vertical direction; and said two locations are in approximate vertical alignment.

6. Apparatus for severing an object as in claim 5, further comprising drainage means for fluid substance contained by said object, said drainage means engaging said means for holding said object.

7. Apparatus for severing an object as in claim 5, wherein said blade has two equal parallel straight sides, said equal parallel straight sides each being adjacent to one said equal right angled straight side, and wherein said means for carrying said blade in an approximately vertical direction includes two parallel guides, said two parallel guides each engaging one said equal parallel straight side.

8. A device for effecting severance as in claim 1, wherein said blade has two equal parallel straight sides, said equal parallel straight sides each being adjacent to one said equal right angled straight side.

9. Apparatus for dividing a structure, said structure including a closed peripheral section, said apparatus comprising:

a holder for positioning said structure;

a substantially flat blade which includes a first blade portion, a second blade portion and a third blade portion, said first blade portion defining a rectangle, said second blade portion defining an isosceles trapezoid, said third blade portion defining an isosceles triangle, said second blade portion being intermediate said first blade portion and said third blade portion, said first blade portion having a parallel pair of equal blunt edges, said second blade portion having an orthogonally converging pair of equal knife edges, said third blade portion having an acutely connecting pair of equal knife edges, said orthogonally converging pair converging toward a first junction, said acutely connecting pair connecting at a second function situated below said first junction, said blade approximately defining an imaginary plane, said imaginary plane containing an imaginary straight line which is both bisectional and altitudinal with respect to each of said rectangle, said isosceles trapezoid and said isosceles triangle; and a carriage mechanism for said blade, said carriage mechanism operatively connected to said holder for permitting a spacing apart of said blade and said structure whereby said blade is oriented with said acutely connecting pair directed, said second junction forward, toward said closed peripheral section, whereby there is an intersection of said closed peripheral section with said imaginary plane, and whereby an imaginary closed peripheral line is formed in said closed peripheral section by said intersection, said carriage mechanism providing approximately linear movability of said blade, said approximately linear movability being approximately within said imaginary plane, in a direction approximately coincident with said imaginary straight line, and across said closed peripheral section.

10. Apparatus for dividing a structure as in claim 9, wherein said carriage mechanism provides approximately linear movability of said blade whereby:

said acutely connecting pair pierces said closed peripheral section at a first location which is approximately on said imaginary closed peripheral line;

in a pair of first opposite directions, said orthogonally converging pair bilaterally cut a first portion of said closed peripheral section, approximately along said imaginary closed peripheral line, said first opposite directions being divergent with respect to said first location and convergent with respect to a second location, said second location being approximately on said imaginary closed peripheral line;

said acutely connecting pair pierces said closed peripheral section at said second location;

in a pair of second opposite directions and in a pair of third opposite directions, said orthogonally converging pair bilaterally cut a second portion of said closed peripheral section, approximately along said imaginary closed peripheral line, said second opposite directions being divergent with respect to said first location and convergent with respect to said second location, said third opposite directions being divergent with respect to said second location and convergent with respect to said first location; and said second opposite directions and said third opposite directions bilaterally meet between said first location and said second location.

11. Apparatus for dividing a structure as in claim 10, wherein:

said structure is positioned by said holder so as to be approximately horizontal;

said imaginary straight line is approximately vertical;

said first location and said second location are in approximate vertical alignment, said first location being above said second location.

12. Apparatus for dividing a structure as in claim 11, wherein said apparatus further comprises means, in engagement with said carriage mechanism, for draining fluid contents from said structure.

13. Apparatus for dividing a structure as in claim 9, wherein:

said closed peripheral section is approximately cylindrical, said closed peripheral section having an imaginary axis of approximate symmetry;

said imaginary plane is approximately perpendicular to said imaginary axis; and said imaginary closed peripheral line is approximately circumferential about said imaginary axis.

14. Apparatus for dividing a structure as in claim 13, wherein said carriage mechanism provides approximately linear movability of said blade whereby said acutely connecting pair pierces said closed peripheral section at a first location, said acutely connecting pair pierces said closed peripheral section at a second location, and said orthogonally converging pair bilaterally cut said closed peripheral section between said first location and said second location.

15. Apparatus for dividing a structure as in claim 14, wherein:

said imaginary axis is approximately horizontal;

said imaginary straight line is approximately vertical, said blade being oriented in an approximately vertical direction, said imaginary plane is approximately vertical, said acutely connecting pair being directed, said second junction forward, approximately downward;

said first location is an approximately top circumferential location;

said second location is an approximately bottom circumferential location; and said first location and said second location are in approximate vertical alignment.

16. Apparatus for dividing a structure as in claim 15, wherein said carriage mechanism provides approximately vertical movability of said blade in a direction approximately coincident with said approximately vertical imaginary straight line, wherein said approximately vertical imaginary straight line is approximately coincident with the diameter of said approximately cylindrical section and intersects said approximately horizontal imaginary axis, wherein said approximately vertical imaginary plane is approximately perpendicular to said approximately horizontal imaginary axis, wherein an imaginary approximately vertical perpendicular plane passes through said approximately vertical imaginary straight line and said approximately horizontal imaginary axis, and wherein said imaginary approximately vertical perpendicular plane bisects said closed peripheral section into two approximately semicylindrical subsections, so that in sequence:

said acutely connecting pair pierces said closed peripheral section at an approximately top location between said approximately semicylindrical subsections;

in approximate concurrence, said orthogonally converging pair cut through both said approximately semicylindrical subsections, approximately along said imaginary closed peripheral line, whereby a first one of said orthogonally converging pair cuts downwardly counterclockwise through a first said approximately semicylindrical subsection, and wherein a second one of said orthogonally converging pair cuts downwardly clockwise through a second said approximately semicylindrical subsection;

said acutely connecting pair pierces said closed peripheral section at an approximately bottom location between said approximately semicylindrical subsections; and in approximate concurrence, said orthogonally conversing pair cut through both said approximately semicylindrical subsections, approximately along said imaginary closed peripheral line, whereby said first one of said orthogonally converging pair cuts both downwardly counterclockwise and upwardly clockwise through said first said approximately semicylindrical subsection, and wherein said second one of said orthogonally converging pair cuts both downwardly clockwise and upwardly counterclockwise through said second said approximately semicylindrical subsection, until said downwardly counterclockwise cutting and upwardly clockwise cutting meet in said first approximately semicylindrical subsection and said downwardly clockwise cutting and upwardly counterclockwise cutting meet in said second approximately semicylindrical subsection.

17. Apparatus for dividing a structure as in claim 15, wherein said carriage mechanism includes two approximately vertical guides, said guides each engaging one of said parallel pair of equal blunt edges.

18. A device for effecting severance of a container having a circumference which is substantially symmetrical about an imaginary axis, said device comprising:

a blade which includes a bottom end point and which defines a polygon having seven linear sides, said seven linear sides consisting of a dull horizontal top side, two dull vertical sides, two major slanted keen sides and two minor slanted keen sides, said two dull vertical sides being equal to each other in length, said two major slanted keen sides being equal to each other in length, said two minor slanted keen sides being equal to each other in length, said two dull vertical sides being disposed so as to be parallel with respect to each other, said two dull vertical sides each being disposed at a ninety degree angle with respect to said dull horizontal top side, said two major slanted keen sides each being disposed at a one hundred thirty-five degree angle with respect to one of said two dull vertical sides, said two minor slanted keen sides each being disposed at an obtuse angle with respect to one of said two major slanted keen sides, said two major slanted keen sides being disposed so as to not meet each other but to tend toward each other at a ninety-degree angle, said two minor slanted keen sides being disposed so as to meet each other at an acute angle at said bottom end point, said dull horizontal top side and said bottom end point being disposed in opposition with respect to each other whereby an imaginary line which intersects said bottom end point is bisectional and perpendicular with respect to said dull horizontal top side, parallel with respect to each of said two dull vertical sides, bisectional with respect to said ninety-degree angle, and bisectional with respect to said acute angle;

a housing for placing said container so that said imaginary axis is horizontal; and mechanical means operatively connected to said housing and including a member which is coupled with said blade, said mechanical means orienting said blade so that said imaginary line is upright and said bottom end point is beneath said dull horizontal top side, said mechanical means mobilizing said member so as to cause downward motion of said blade along said imaginary line, said downward motion including a range between a first stationary blade position and a second stationary blade position, wherein:

when said blade is in said first stationary blade position, said two minor slanted keen sides are situated above said container;

when said blade is moving in said range, said two minor slanted keen sides effect an upper perforation of said container, said two major slanted keen sides downwardly and oppositely cut said container around said circumference, said two minor slanted keen sides effect a lower perforation of said container, and said two major slanted keen sides both downwardly, oppositely and upwardly, oppositely cut said container around said circumference; and when said blade is in said second stationary blade position, said two minor slanted keen sides are situated below said container and said severance has been effected.

\* \* \* \* \*